United States Patent [19]

Papalexis et al.

[11] Patent Number: 4,497,233
[45] Date of Patent: Feb. 5, 1985

[54] HOTDOG ROLL SLICER

[76] Inventors: Gregory C. Papalexis, Cambridge Way, Alpine, N.J. 07620; Richard I. Elliott, 103 Pennfield Ave., Croton-on-Hudson, N.J. 10520

[21] Appl. No.: 500,843

[22] Filed: Jun. 3, 1983

[51] Int. Cl.³ .............................................. B26D 3/30
[52] U.S. Cl. ...................................... 83/873; 83/422; 83/444; 83/450
[58] Field of Search .................. 83/870–874, 83/422, 450, 444, 449

[56] References Cited

U.S. PATENT DOCUMENTS

| | | | |
|---|---|---|---|
| 1,766,450 | 6/1930 | Ost | 83/872 |
| 1,903,238 | 3/1933 | Larson | 83/872 |
| 2,046,681 | 7/1936 | Haralson et al. | 83/872 |
| 2,361,615 | 10/1944 | Elrod | 83/872 |
| 2,803,279 | 8/1957 | Strand | 83/873 |
| 3,911,769 | 10/1975 | Lecrone | 83/873 |

Primary Examiner—James M. Meister
Attorney, Agent, or Firm—Peter C. Michalos; Constantine A. Michalos

[57] ABSTRACT

A roll slicer device having an endless belt with an upper run movable in a feed direction, including a fixed skid plate having a smooth lower surface spaced above said upper run and extending in the feed direction. The device also having a slicer horizontally movable in a space between the skid plate and the upper run for slicing a roll supplied between the skid plate and the upper run.

1 Claim, 2 Drawing Figures

U.S. Patent    Feb. 5, 1985    4,497,233
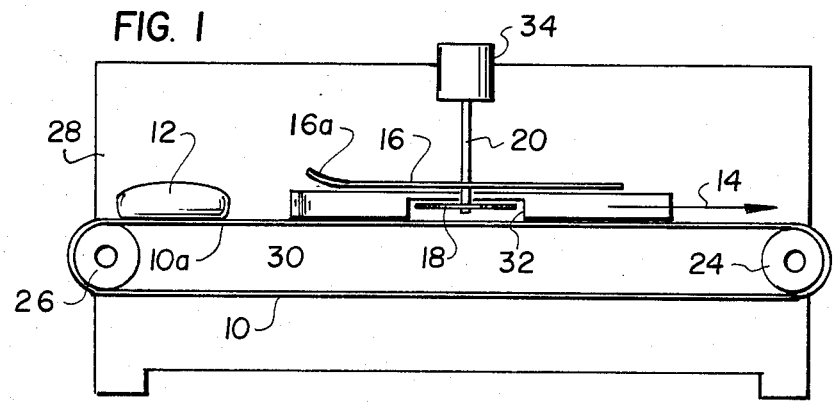
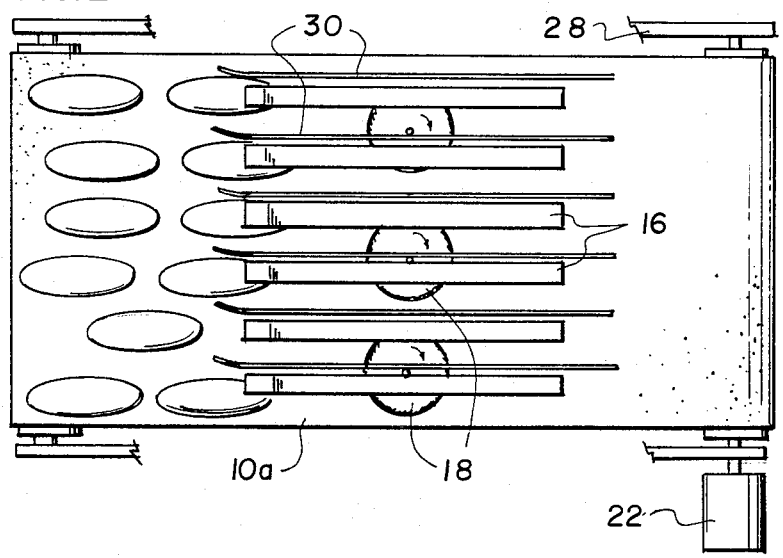

HOTDOG ROLL SLICER

FIELD AND BACKGROUND OF THE INVENTION

The present invention relates in general to bakery equipment and in particular to a new and useful device for slicing an elongated hotdog roll.

Equipment is known for slicing an elongated roll into roughly equal halfs after rolls have been baked and cooled. Such devices utilize upper and lower spaced conveyor belts which grasp rolls there between and pass the rolls into contact with a horizontally rotating blade which slices the rolls. To operate correctly the upper and lower belts must move at the same speed.

SUMMARY OF THE INVENTION

According to the present invention, only a single conveyor belt is utilized which has a friction surface. The conveyor belt carries a series of rolls under a metal skid having a smooth lower surface. A horizontally rotating blade is positioned in the vicinity of the skid plate with the blade positioned approximately half way between the lower surface of the plate and the upper surface of the belt. Elongated, in particular hotdog rolls, can thus be sliced with simplified equipment which resists brake-down.

Accordingly an object of the invention is to provide a hotdog roll slicer which comprised a friction belt movable in a feed direction for carrying an elongated roll, a fixed skid plate positioned above the conveyor belt by a distance slightly less than the height of a roll to be sliced, and a slicing blade rotatable in the space between the skid and belt for slicing the roll.

A further object of the invention is to provide a hotdog roll slicer which is simple in design rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be made to the accompanying drawings and descriptive matter in which there is illustrated a preferred embodiment of the invention.

BRIEF DESCRIPTION OF THE DRAWINGS

In the drawings:

FIG. 1 is a side elevational view of the inventive hotdog roll slicer; and

FIG. 2 is a top plan view of the device.

DESCRIPTION OF THE PREFERRED EMBODIMENT

Referring to the drawings in particular, the invention embodied therein, comprises an endless conveyor belt 10 having a friction surface. Such belts are commercially available and are made for example of gum rubber.

A plurality of elongated rolls 12 are provided by baking and cooling equipment (not shown) onto the forward or upstream end of the top run 10a of the conveyor belt 10. The rolls are moved in a feed direction shown by arrow 14, under a plurality of fixed skid plates 16 which are made of metal and has smooth flat lower surfaces and an up turned forward end 16a. The spacing between the lower surface of plate 16 and the upper surface of conveyor belt run 10a, is slightly less than the vertical height of the rolls 12 so that, with the belt moving in direction 14, the rolls are held and squeezed in position as they move in the feed direction. Plates 16 also have a width transverse to the direction of arrow 14 which is less than that of the rolls as shown in FIG. 2. Rotating blades 18 rotatably mounted on shafts 20 are positioned as shown in FIG. 2, to cut adjacent rolls 12 as they are moved under skids 16. Blades 18 are preferrably of the type used in milling machines. The blades are thus highly resistant to wear and need infrequent replacement.

According to the invention, an upper endless belt which is normally used in slicing machines of this type is removed and only the lower belt remains which is adapted with a friction surface to frictionally engage the lower part of the rolls 12. Friction surfaces are conventionally known for belts and commercially available. They may incorporate a grit sandpaper like surface.

Endless belt 10 is movable in any conventional manner, for example using a motor 22 as drive means. Belt 10 is trained around a drive pully 24 and an idler pully 26, connected to a frame 28 shown only schematically.

To confine the rolls 12 in a proper alignment with the skids 16, side fences 30 are provided which, where necessary, include slots 32 for permitting the movement of blades 18. Blades 18 are also driven over shafts 20 by drive means in the form of a motor 32 or belts which drive all of the blades utilizing a single motor.

While a specific embodiment of the invention have been shown and described in detail to illustrate the application of the principles of the invention, it will be understood that the invention may be embodied otherwise without departing from such principles.

What is claimed is:

1. A roll-slicer device for slicing elongated rolls, comprising:

an endless belt having an upper horizontal run movable in a feed direction, said belt having a friction surface for frictionally engaging each elongated roll to be sliced;

drive means operatively engaged with said belt for driving said belt upper run in a horizontal feed direction;

a plurality of fixed horizontal skid plates, each having a flat, smooth, horizontal lower surface spaced away from said upper run and each extending in the feed direction, said skid plates being laterally spaced in a direction transverse to the feed direction for each of a plurality of rows of elongated rolls to be sliced, each skid plate having an upturned end in the upstream side thereof in the feed direction and a width transverse to the feed direction which is less than a width of an elongated roll to be sliced, a spacing between each skid plate and said upper run being selected to be slightly less than a height of an elongated roll to be sliced;

a plurality of slicers horizontally movable in the space between said skid plates and said upper run for slicing a roll supplied between a skid plate and said upper run, each slicer comprising a circular blade rotatably mounted in a horizontal plane and a shaft connected to said blade for rotating said blade, each slicer being mounted between two adjacent ones of said skid plates for slicing elongated rolls in two adjacent rows of rolls under said two adjacent skid plates; and a side fence extending in said feed direction adjacent each skid plate and positioned to define a path for a row of rolls under each skid plate, at least one of said fences having a slot through which at least one of said circular blades is rotatable, each side fence having an outturned upstream end and spacing between adjacent side fences being sufficient to accept a row of rolls to be sliced, each fence having a height extending in the space between said skid plates and said upper run which is less than a total height of the space between said skid plates and upper run.

* * * * *